United States Patent
Hsu et al.

(10) Patent No.: US 8,134,536 B2
(45) Date of Patent: Mar. 13, 2012

(54) ELECTRONIC DEVICE WITH NO-HINDRANCE TOUCH OPERATION

(75) Inventors: Chih-Feng Hsu, Taoyuan County (TW); Yih-Feng Kao, Taoyuan County (TW); John C. Wang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 800 days.

(21) Appl. No.: 12/121,290

(22) Filed: May 15, 2008

(65) Prior Publication Data

US 2008/0284753 A1 Nov. 20, 2008

(30) Foreign Application Priority Data

May 15, 2007 (TW) .............................. 96117304 A

(51) Int. Cl.
*G06F 3/044* (2006.01)
*G06F 3/041* (2006.01)
(52) U.S. Cl. ...................... 345/173; 345/174
(58) Field of Classification Search ........... 345/156–179
See application file for complete search history.

(56) References Cited

U.S. PATENT DOCUMENTS

| 5,610,629 A | 3/1997 | Baur | 345/104 |
| 5,945,980 A | 8/1999 | Moissev et al. | 345/173 |
| 6,611,258 B1 * | 8/2003 | Tanaka et al. | 345/179 |
| 2002/0080123 A1 * | 6/2002 | Kennedy et al. | 345/173 |
| 2006/0197750 A1 * | 9/2006 | Kerr et al. | 345/173 |

FOREIGN PATENT DOCUMENTS

| CN | 2476846 | 2/2002 |
| EP | 0 927 949 | 7/1999 |
| EP | 1 628 196 | 2/2006 |
| JP | 09-231006 | 9/1997 |
| JP | 2003-271310 | 9/2003 |

OTHER PUBLICATIONS

Chinese Second Examination Report of China Application No. 200710106307.X, dated Feb. 1, 2011.

* cited by examiner

*Primary Examiner* — Amare Mengistu
*Assistant Examiner* — Jennifer Zubajlo
(74) *Attorney, Agent, or Firm* — J.C. Patents

(57) ABSTRACT

An electronic device with no-hindrance touch operation is provided. A processor in the electronic device receives an input signal through a touch display. Then the processor determines the type of the input tool which generates the input signal. Finally, a user interface corresponding to the tool type is switched and displayed. In addition, the electronic device may open or close specific functions automatically according to the tool type. As a result, the efficiency of switching user interfaces is improved, and furthermore the convenience of operating the electronic device is increased.

15 Claims, 12 Drawing Sheets

ELECTRONIC DEVICE WITH NO-HINDRANCE TOUCH OPERATION

CROSS-REFERENCE TO RELATED APPLICATION

This application claims the priority benefit of Taiwan application serial no. 96117304, filed on May 15, 2007. All disclosure of the Taiwan application and co-pending US patent application by the same applicant, entitled "METHOD FOR IDENTIFYING THE TYPE OF AN INPUT TOOL FOR A HANDHELD DEVICE", which claims the priority benefit of Taiwan application serial no. 96117295, filed on May 15, 2007, are incorporated herein by reference.

BACKGROUND OF THE INVENTION

1. Field of the Invention

The present invention relates to a method for identifying the type of an input tool of an electronic device. More particularly, the present invention relates to the various applications of the method.

2. Description of the Related Art

In the fast-paced life of modern people, it has become a common habit to emphasize convenience and efficiency for daily tasks. Take handheld devices such as cell phones or personal digital assistants (PDAs) for example, in addition to features such as powerful functions, light weight, and compact design, the users generally expect to open and execute the necessary functions in a very short time. The expectation is especially true for frequently used functions like editing short messages or looking up communication records. The convenience of handheld devices would be improved if the users can open some frequently used functions quickly when manipulating the handheld devices.

In order to meet the above demand, manufacturers of handheld devices install hot keys corresponding to specific frequently used functions on the casing or keyboard of handheld device at the design stage. Therefore, when the user presses a hot key, a corresponding frequently used function can be opened on quickly in order to shorten the time spent on searching and opening the function. For example, some manufacturers install a button for opening the photo-shooting function on the side of cell phones so that the photo-shooting function of a cell phone can be activated immediately when the user presses the button.

However, in the increasing trend toward light weight and compactness, the space for the manufacturers to install hot keys is quite limited. Besides, the expectation of the users for exterior design of handheld devices cannot be ignored. In order to ensure the design and shape of handheld devices conform to aesthetic standards, manufacturers have to limit the number of hot keys at the design stage. Consequently only a few hot keys are available for meeting the requirement of quick activation of frequently used functions.

As a result, only a few functions of a handheld device have corresponding hot keys for quick activation by the user. When the user wants to execute a function without corresponding hot key, the user has to open the function by manipulating the menu of the handheld device. Because generally the menu of a handheld device has a tree structure, and most of the time the menu is shown on the display of the handheld device, the user may need to find the function he/she needs by selecting and entering several sub-menus in the user interface on the touch sensing means overlapped with the display. For some frequently used functions, if every time they have to be executed in the way described above, a lot of time would be wasted and there would be significant inconvenience in using the handheld device.

Generally speaking, at present most users select menu items by means by contact or sensing behavior between finger or stylus and the touch sensing means. However, for conventional handheld devices, the user interface offers no difference (such as the user interface shown in FIG. 6) no matter the selection is made with finger or stylus. A user exhibits different input characteristics when he/she performs input action on the touch sensing means with finger or stylus respectively. Generally a stylus is more precise than a finger is, therefore the stylus is capable of more precise operation in the user interface, such as typing on a virtual keyboard shown on the display or selecting items on a more compact menu. On the other hand, inputting with a finger on the touch sensing means is more instinctive, quicker, and more convenient to the user because the user may operate with just a hand without the trouble of drawing a stylus, although the finger has a larger contact area on the touch sensing means and is more prone to accidentally touch other items on the user interface.

In summary, conventional handheld devices have some deficiency. The first one is that certain specific functions have to be selected and activated through an extensive unfolding of the layers of the menu by the user. The second one is that either the finger or the stylus is not an ideal input tool for the user interface of a conventional handheld device because the stylus is more agile but more cumbersome for the user while the finger is more convenient for the user but is more clumsy and is more prone to erroneous contact.

In view of the above, it would be very convenient for the user if a handheld device can offer different operation mechanism in response to different input tools. For example, the handheld device could provide an operation mechanism suitable for a stylus when the stylus is being used and, on the other hand, provide another operation mechanism suitable for a finger when the finger is being used. Besides, a problem derived from such an expectation is how to switch between these different operation mechanisms.

Furthermore, the casing of a conventional handheld device is usually directly adjacent to the edge of the display area of the touch display and is more extrusive relative to the sensing surface of the touch display. Because the extrusion of the casing hampers the operation of the input tool (such as a finger or a stylus) and tends to scratch the finger, the user cannot touch the pixels on the edge of the display area of the touch display quickly and effectively in order to perform a smooth touch operation. In addition, although the non-display area of a touch display is capable of sensing a touch contact, the casing of a conventional handheld device usually covers this non-display area, thus hampering the touch operation of the user and limits the application of the touch sensing capability of the touch display.

SUMMARY OF THE INVENTION

Accordingly, the present invention is directed to an electronic device with no-hindrance touch operation.

According to an embodiment of the present invention, the aforementioned electronic device has at least two user interfaces with different configuration. The menu items for user selection in one of the user interfaces are more numerous and more compact, suitable to be selected and activated by a stylus. The menu items for user selection in another one of the user interfaces are bigger and less numerous, suitable to be selected and activated by a finger.

The present invention is capable of identifying the type of the input tool and executing different predetermined functions according to the type of the input tool, such as switching the user interface.

According to an embodiment of the present invention, an electronic device with no-hindrance touch operation is provided. The electronic device includes a casing, a touch display, and a processor. The casing has an opening. The touch display is disposed in the opening of the casing for receiving an operation of an input tool. The touch display has a sensing surface. The outer surface of the casing is substantially level with the sensing surface. The processor is electrically coupled to the touch display for identifying the type of the input tool and executing a predetermined function according to the type of the input tool.

The present invention is capable of identifying the type of the input tool according to characteristics of the input tool such as contact area, contact pressure, detected area, tool temperature, or image when the input tool contacts with or approaches the touch display of an electronic device. The present invention is further capable of switching to and displaying the corresponding user interface automatically according to different types of the input tool. In addition, the present invention is also capable of opening or closing specific functions automatically according to the type of the input tool. Thus the present invention improves the efficiency of switching the user interface and also improves the convenience of using electronic devices.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
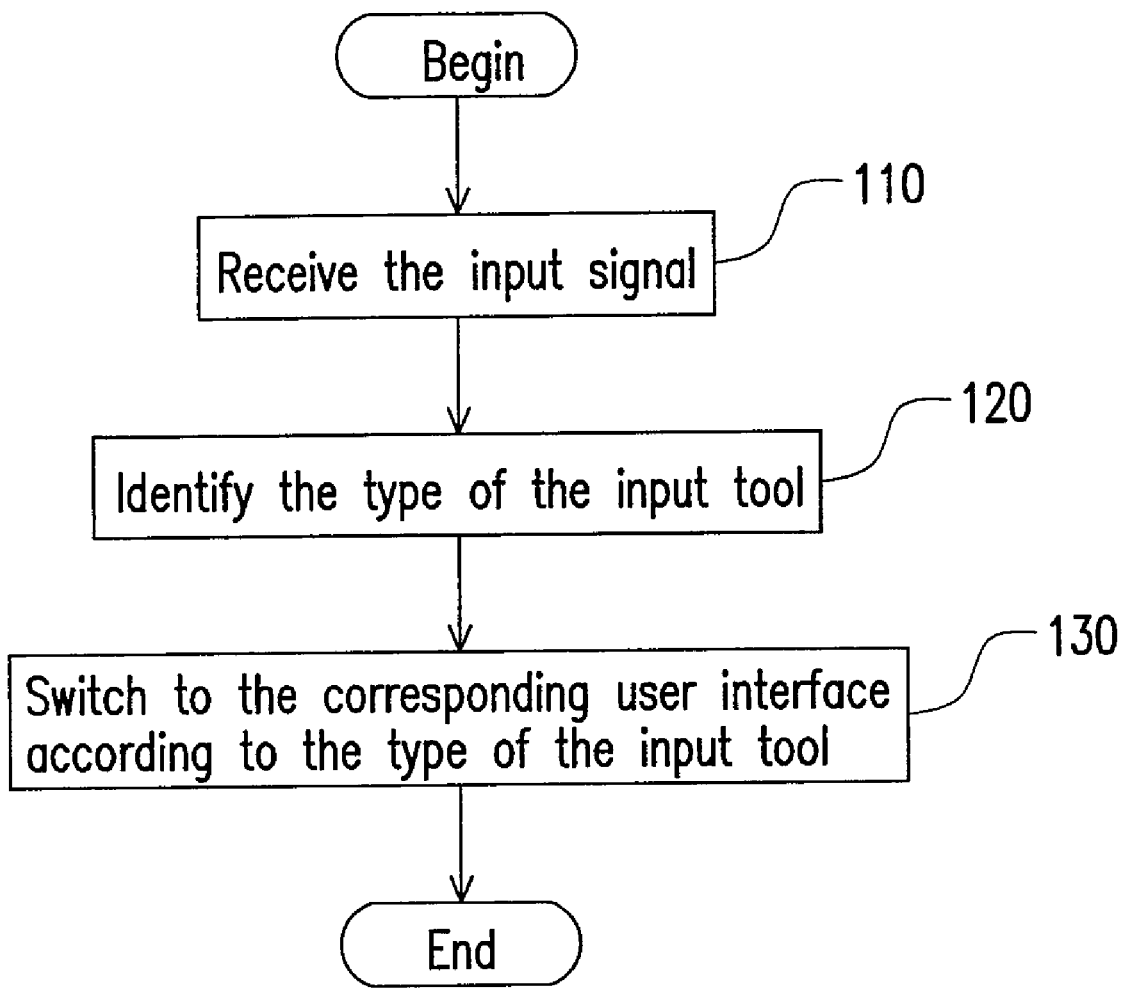
FIG. 1 is the flow chart of a method for operating a user interface according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

On a conventional handheld device, the user can only press hot keys to open some specific functions quickly. However, the number of hot keys on a handheld device is limited. If a handheld device can provide a user interface displaying multiple frequently used functions at the same time so that the user can use them rapidly, it would certainly improve the convenience of using the handheld device. The present invention includes a method for operating a user interface and a handheld device using the method, which are developed based on the aforementioned prospect. For a clear description of the present invention, embodiments are discussed to demonstrate the implementation of the present invention.

FIG. 1 is a flow chart of a method for operating a user interface according to an embodiment of the present invention. Please refer to FIG. 1. This embodiment discusses the detailed steps about how a handheld device switches to a corresponding user interface automatically according to different types of the input tool when a user operates the handheld device. The handheld device may be a cell phone, a PDA, or a smart phone, etc. The type of the handheld device is not limited in the present invention.

First, at step 110, the handheld device receives an input signal in a user interface when a user operates the handheld device via an input tool. Next, at step 120, the handheld device identifies the type of the input tool according to the area, pressure, temperature, or image detected by the touch sensing means when the input tool contacts or approaches the touch sensing means of the handheld device. Finally, as shown by step 130, the handheld device switches to and displays the corresponding user interface according to the type of the input tool.

Please note that the aforementioned operating method may be divided into two parts. The first part is a method for identifying the type of the input tool (steps 110 and 120). The second part is a method for applying the result of the identification (step 130). In other words, in the flow of the method shown in FIG. 1, this embodiment provides at least the identification method including steps 110 and 120, while the flow after step 120 may be a custom design according to the requirement of practical application. Step 130 in FIG. 1 serves only to demonstrate an embodiment of the present invention (the switching of the user interface). In this embodiment, the handheld device displays different corresponding user interfaces according to the various types of input tools. For convenience, the following embodiments of the present invention focus on an example of differentiating two different types of input tools, such as a stylus and a finger of the user. The following embodiments of the present invention also focus on the flow of switching to the corresponding user interface according to these two types of input tools. In the scope of the present invention, there may be an arbitrary number of input tool types.

In the following embodiments of the present invention, the user interface corresponding to the stylus is a general user interface which includes all the functions of the handheld device, while the user interface corresponding to the finger is a frequently used function interface which displays part of the functions of the handheld device. The functions displayed on the frequently used function interface may be preset according to the habit or requirement of the user.

This embodiment includes a number of methods for identifying the type of the input tool. Each aforementioned identification method requires different hardware design, as shown in the block diagrams of handheld devices in FIG. 2A to FIG. 2D, which are discussed below.

Figure 2A:
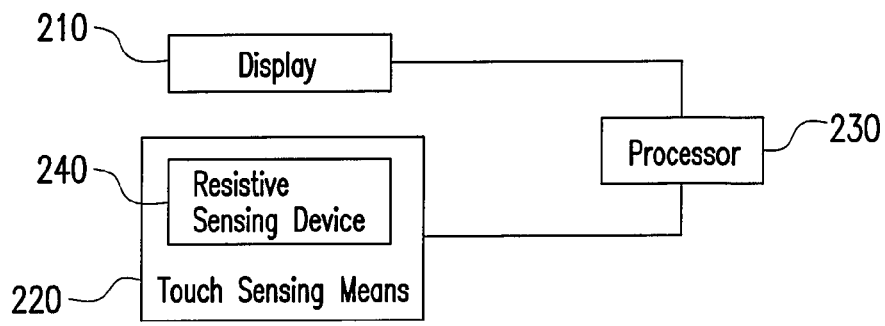
FIG. 2A to FIG. 2D are block diagrams of a handheld device capable of switching user interface according to an embodiment of the present invention.

The handheld device in FIG. 2A includes a display 210, a touch sensing means 220, and a processor 230. The display 210 displays a user interface. The touch sensing means 220 may be a touch panel for detecting the operation of the input tool and provides an input signal according to the operation of the input tool. The processor 230 is coupled to the display 210 and the touch sensing means 220 for identifying the type of the input tool and switch to the corresponding user interface according to the type of the input tool.

Figure 3A:
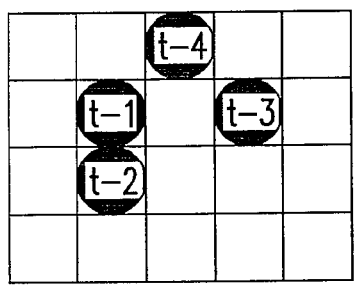
FIG. 3A and FIG. 3B are schematic diagrams showing the contact area of input tools according to an embodiment of the present invention.
Figure 3B:
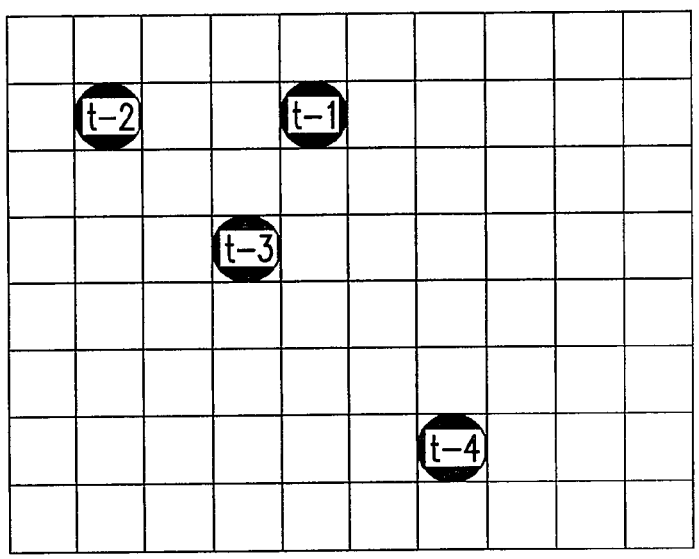

The touch sensing means 220 in FIG. 2A includes a resistive sensing device 240. A resistive sensing device can detect the contact position and contact pressure of an input tool, therefore the input signal provided by the touch sensing means 220 includes information such as the contact position and contact pressure of the input tool. Please note that a resistive sensing device can only provide the input signal of a single contact point at a time and the contact point is distributed within the contact area of the input tool and the resistive sensing device, as shown in FIG. 3A and FIG. 3B. The resistive sensing device can only determine whether there is a contact with the input tool. The resistive sensing device is not able to identify the type of the input tool by itself. Therefore a method proposed by the present invention is required, which identifies the type of the input tool by collecting the input signals of multiple contact points in a certain predetermined duration. The contact area of a stylus is smaller and therefore the contact points are more concentrated, as the contact points t-1, t-2, t-3, and t-4 shown in FIG. 3A. In this case, the method provided by the present invention can determine that the input tool in contact with the resistive sensing device is a stylus. The contact area of a finger is larger and therefore the contact points are more distributed, as the contact points t-1, t-2, t-3, and t-4 shown in FIG. 3B. In this case, the method provided by the present invention can determine that the input tool in contact with the resistive sensing device is a finger. Because the resistive sensing device can only provide the input signal of a single contact point at a time, the processor 230 executing the method provided by the present invention (details below) keeps recoding the information of the input signal in a specific duration. Next, the processor 230 calculates the variation range of the information, and then identifies the type of the input tool according to the size of the variation range.

Take the contact points t-1, t-2, t-3, and t-4 in FIG. 3A and FIG. 3B for example, assume that the input signal generated by the contact point t-i is (Xi, Yi, Pi), wherein i may be 1, 2, 3, or 4. Xi is the X coordinate of the contact position of the contact point t-i. Yi is the Y coordinate of the contact position of the contact point t-i. Pi is the contact pressure of the contact point t-i. The processor 230 may calculate the average values of the contact position and the contact pressure as follows.

Average X coordinate: Xa=(X1+X2+X3+X4)/4.
Average Y coordinate: Ya=(Y1+Y2+Y3+Y4)/4.
Average pressure: Pa=(P1+P2+P3+P4)/4.

Next, the variation ranges of the contact position and the contact pressure may be calculated as follows.

Variation range of the X coordinate: Xd=|Xa−X1|+|Xa−X2|+|Xa−X3|+|Xa−X4|.
Variation range of the Y coordinate: Yd=|Ya−Y1|+|Ya−Y2|+|Ya−Y3|+|Ya−Y4|.
Variation range of the contact pressure: Pd=|Pa−P1|+|Pa−P2|+|Pa−P3|+|Pa−P4|.

Figure 4A:
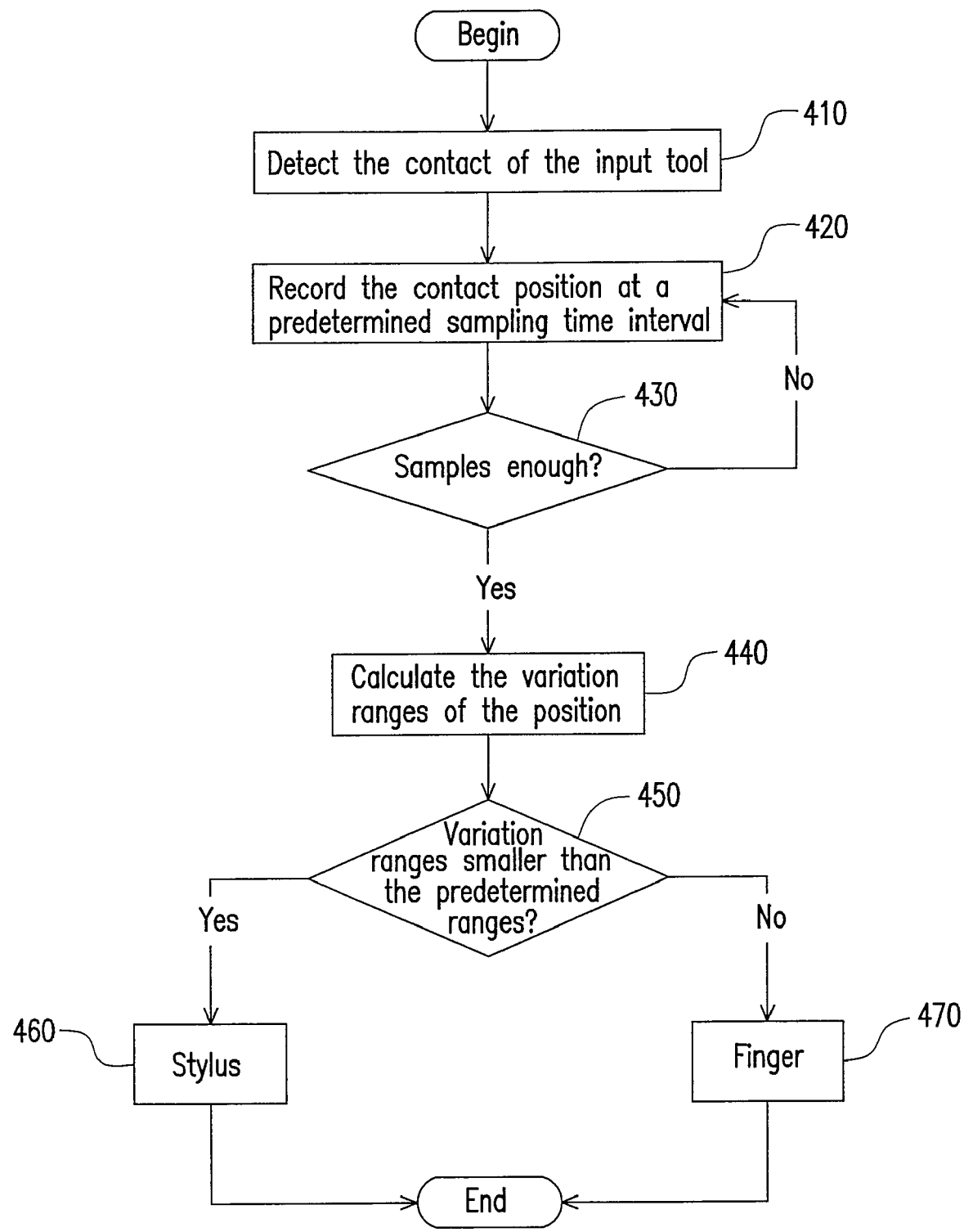
FIG. 4A to FIG. 4C are flow charts of a method for identifying the type of an input tool according to an embodiment of the present invention.
Figure 4B:
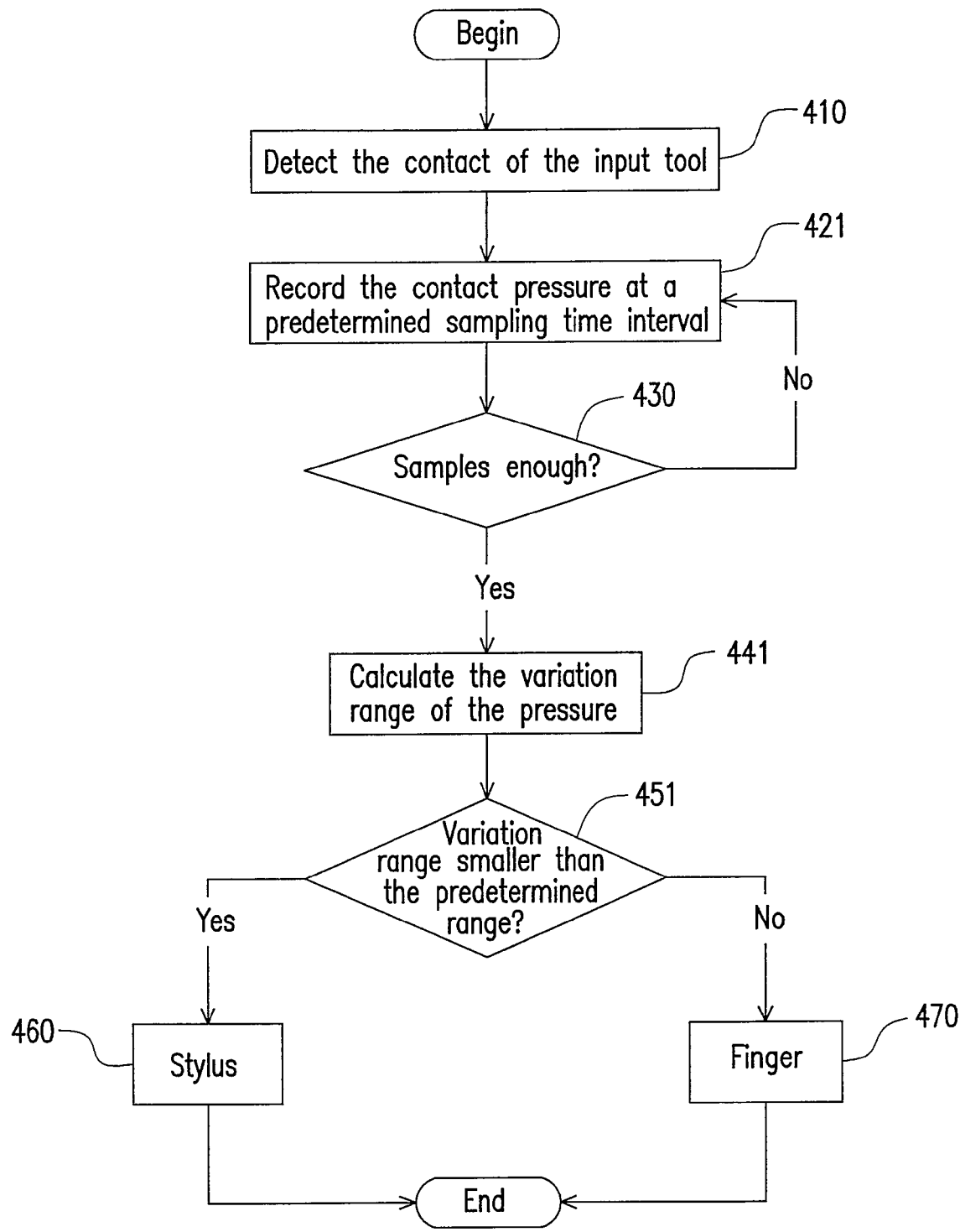
Figure 4C:
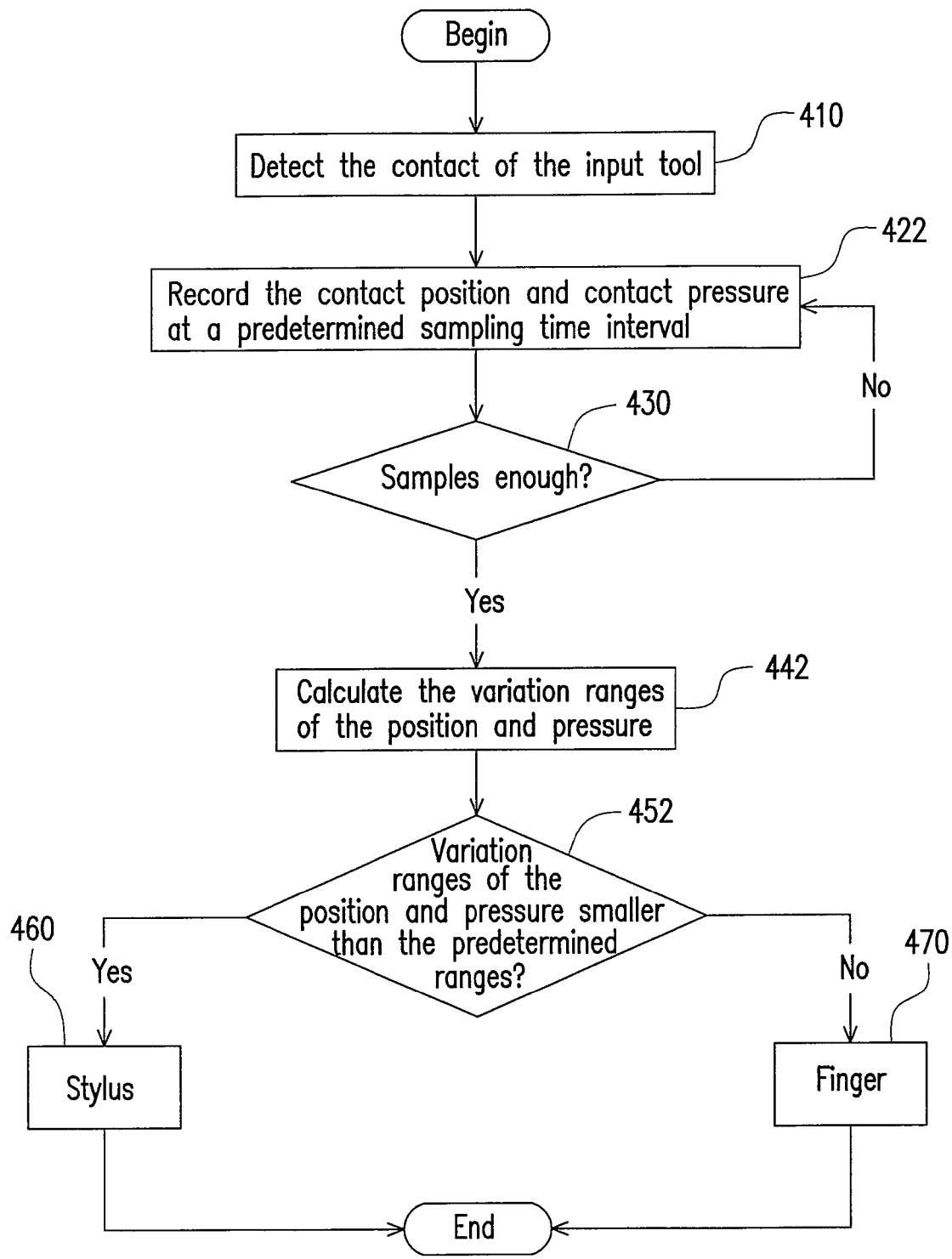

The flow charts shown in FIG. 4A to FIG. 4C are related to the details about how to identify the type of the input tool according to the variation ranges of the position and the pressure. The details are discussed below.

FIG. 4A is a flow chart of the method for identifying the type of an input tool executed by the processor 230 in FIG. 2A. The flow in FIG. 4A identifies the type of the input tool according to the variation range of the contact position. First, at step 410, detect the contact of the input tool. At step 420, record the X, Y coordinates of the contact points at a predetermined sampling time interval. Next, at step 430, check whether the number of samples is enough. If the number of samples satisfies the predetermined threshold of the processor 230, the flow enters step 440. Otherwise the flow returns to step 420 to keep sampling.

Next, at step 440, calculate the variation ranges Xd and Yd of the contact position. At step 450, check whether Xd<Vx and Yd<Vy, wherein Vx and Vy are the predetermined ranges of the processor 230. If both the variation ranges of the two coordinates are smaller than the corresponding predetermined ranges, the processor 230 determines at step 460 that the type of the input tool is stylus and switches the user interface to a corresponding general user interface. Otherwise the processor 230 determines at step 470 that the type of the input tool is finger and switches the user interface to a corresponding frequently used function interface.

FIG. 4B is the flow chart of another method for identifying the type of the input tool executed by the processor 230. The flow in FIG. 4B identifies the type of the input tool according to the variation range of the contact pressure. At step 421, the processor 230 records the contact pressure of the input tool at a predetermined sampling time interval. At step 441, calculate the variation range Pd of the contact pressure. Next, at step 451, check whether Pd<Vp, wherein Vp is the predetermined range of the processor 230. If Pd<Vp, the processor 230 determines at step 460 that the type of the input tool is stylus and switches the user interface to a corresponding general user interface. Otherwise the processor 230 determines at step 470 that the type of the input tool is finger and switches the user interface to a corresponding frequently used function interface. The other steps in FIG. 4B are the same as their counterparts in FIG. 4A. Therefore there is no need for repeated discussions here.

FIG. 4C is the flow chart of another method for identifying the type of the input tool executed by the processor 230. The flow in FIG. 4C identifies the type of the input tool according to the variation ranges of the contact position and the contact pressure at the same time. At step 422, the processor 230 records the contact position and the contact pressure of the input tool at a predetermined sampling time interval. At step 442, calculate the variation ranges Xd, Yd of the contact position and the variation range Pd of the contact pressure. Next, at step 452, check whether Xd<Vx, Yd<Vy, and Pd<Vp. If all these inequalities are true, the processor 230 determines at step 460 that the type of the input tool is stylus and switches the user interface to a corresponding general user interface. Otherwise the processor 230 determines at step 470 that the type of the input tool is finger and switches the user interface to a corresponding frequently used function interface. The other steps in FIG. 4C are the same as their counterparts in FIG. 4A. Therefore there is no need for repeated discussions here.

Figure 2B:
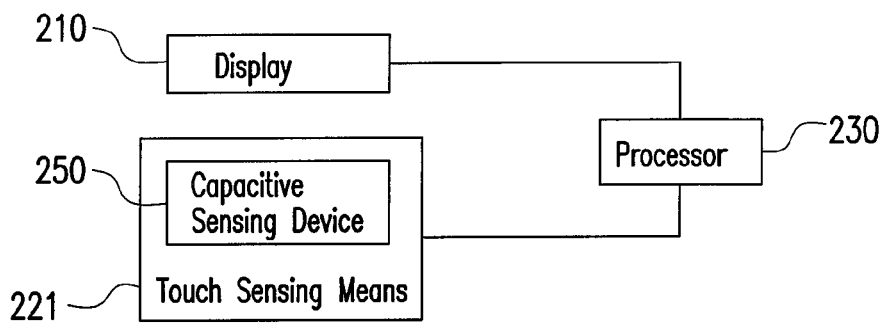

Next, a method for identifying the type of the input tool carried out by another hardware design is discussed. Please refer to FIG. 2B and FIG. 5. FIG. 2B is a block diagram of a handheld device according to another embodiment of the present invention. The major difference between FIG. 2B and FIG. 2A is replacing the touch sensing means 220 in FIG. 2A with the touch sensing means 221 including a capacitive sensing device 250. A capacitive sensing device includes a number of sensing pads arranged in a matrix. A sensing pad generates capacitive effect and detects the contact or approaching of a conductor only when the conductor is large enough in size. A finger is a conductor large enough for a sensing pad to detect it. If a stylus is made with conductor and is sufficiently large, the sensing pad can detect it, too. Generally a capacitive sensing device detects the input tool in a scanning manner. Consequently the input tool may be detected by several sensing pads in the same time or in a very short duration. Because a capacitive sensing device can only detect the contact of an input tool and cannot identify the type of the input tool by itself, a method provided by the present invention is required, which identifies the type of the input tool by the input signals generated by multiple sensing pads in a short duration. When executing the method provided by the present invention (details below), the processor 230 in FIG. 2B is able to calculate the size of the contact area and then identify whether the input tool is a finger or a stylus according to the number of sensing pads which detect the input tool.

Figure 5:
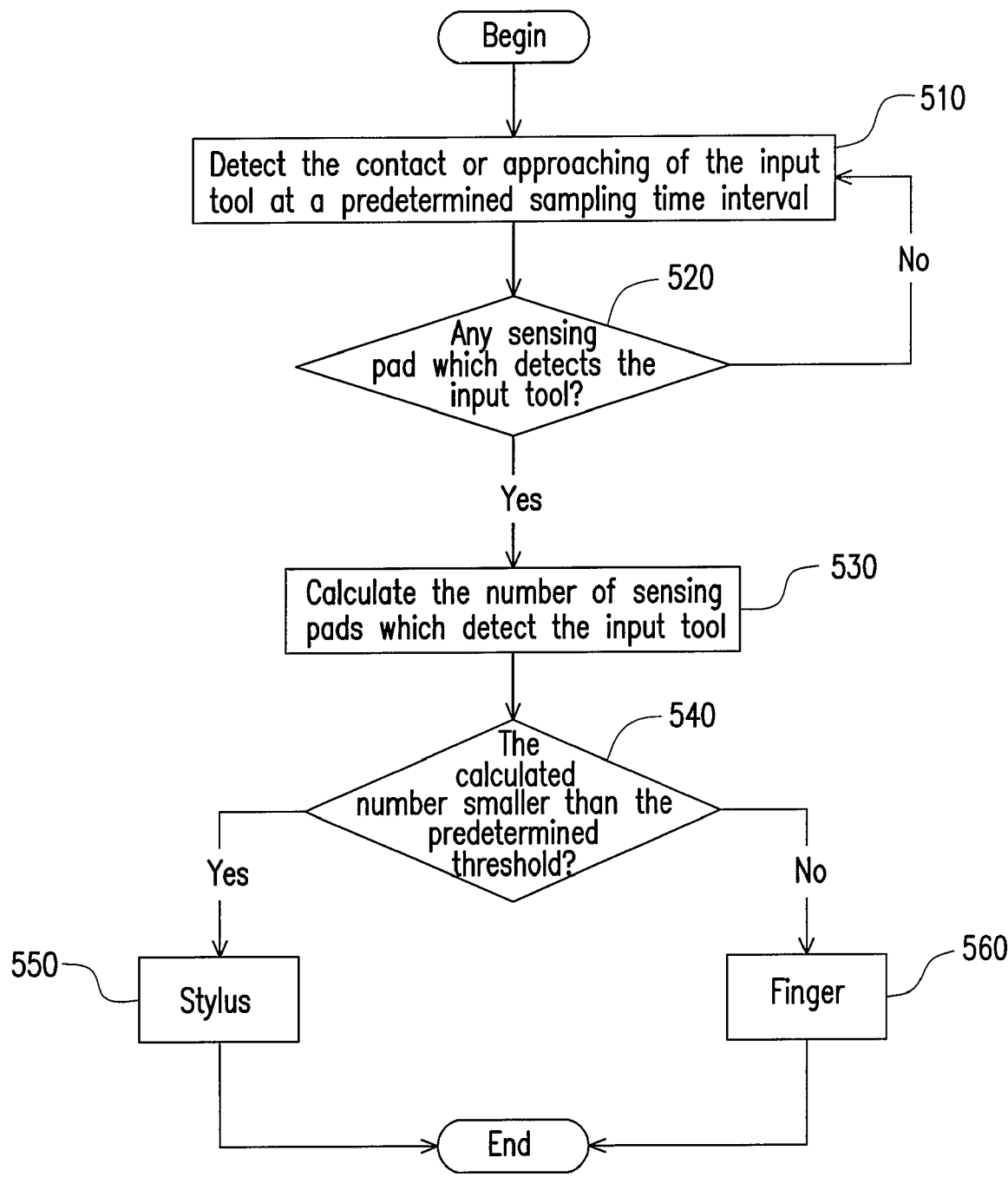
FIG. 5 is a flow chart of a method for identifying the type of an input tool according to another embodiment of the present invention.

FIG. 5 is a flow chart of a method for identifying the type of the input tool executed by the processor 230 in FIG. 2B. First, at step 510, detect the contact or approaching of the input tool at a predetermined sampling time interval. Next, at step 520, check whether there is any sensing pad which detects the input tool. If there is no such sensing pad, the flow returns to step 510 to keep detecting. If there is at least one sensing pad which detects the input tool, the flow enters step 530 to calculate in a predetermined specific duration the number of sensing pads of the capacitive sensing device 250 which detect the input tool when the input tool is operating on the touch sensing means 221. Next, at step 540, check whether the aforementioned number of sensing pads is smaller than the predetermined threshold of the processor 230. If it is, the processor 230 determines at step 550 that the type of the input tool is stylus and switches the user interface to a corresponding general user interface. Otherwise the processor 230 determines at step 560 that the type of the input tool is finger and switches the user interface to a corresponding frequently used function interface. The aforementioned predetermined threshold may be set according to the area density of the sensing pads.

Figure 2C:
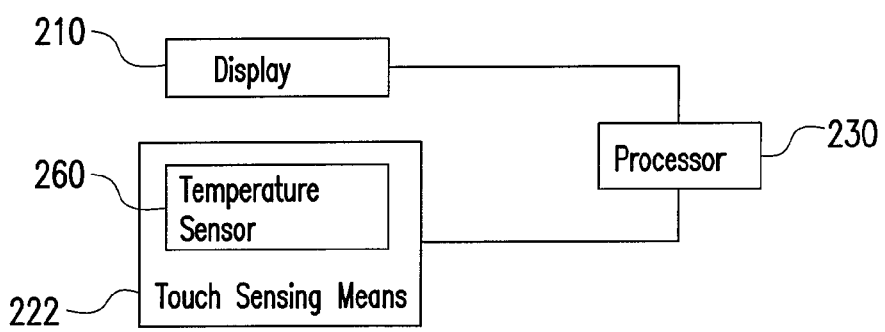

FIG. 2C is a block diagram of a handheld device according to another embodiment of the present invention. The major difference between FIG. 2C and FIG. 2A is replacing the touch sensing means 220 in FIG. 2A with the touch sensing means 222 including a temperature sensor 260. In this embodiment, the processor 230 identifies the type of the input tool according to the temperature of the input tool when the input tool contacts with or approaching the touch sensing means 222. Please refer to FIG. 1 and FIG. 2C. When a user operates on the touch sensing means 222 with an input tool, the processor 230 receives a corresponding input signal (step 110). At this moment, the processor 230 detects the temperature of the input tool through the temperature sensor 260 and compares the temperature of the input tool with a predetermined temperature (such as the average of the room temperature and the body temperature). If the temperature of the input tool is lower than the predetermined temperature, the processor 230 determines that the type of the input tool is stylus. Otherwise the processor 230 determines that the type of the input tool is finger (step 120). Next, the processor 230 displays a corresponding general user interface or frequently used function interface on the display 210 according to the type of the input tool, as discussed in the previous embodiments of the present invention (step 130).

Figure 2D:
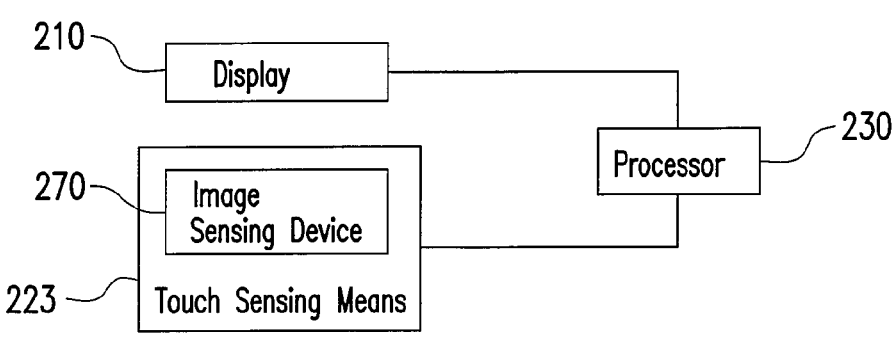

Except identifying the type of the input tool by means of difference in contact area, contact pressure, and contact temperature, in the embodiment of the present invention shown in FIG. 2D, the processor 230 may utilize image recognition techniques in order to identify the type of the input tool.

Please refer to FIG. 1 and FIG. 2D. FIG. 2D is a block diagram of a handheld device according to another embodiment of the present invention. The major difference between FIG. 2D and FIG. 2A is replacing the touch sensing means 220 in FIG. 2A with the touch sensing means 223 including an image sensing device 270. At step 110, when a user operates on the touch sensing means 223 with an input tool, the processor 230 receives an input signal through the touch sensing means 223. Next, at step 120, the processor 230 controls the image sensing device 270 to obtain an image including the input tool and identifies the type of the input tool according to the features or dimension of the input tool in the image. For example, the processor 230 may extract features such as edge contours of the input tool in the image by image recognition techniques and then identify the type of the input tool according to the extracted features. Besides, the processor 230 may calculate the dimension of the input tool in the image and identify the type of the input tool by comparing the dimension of the input tool with a reference dimension. If the processor 230 determines that the type of the input tool is stylus, the processor 230 displays the general user interface on the display 210 at step 130. If the processor 230 determines that the type of the input tool is finger, the processor 230 displays the frequently used function interface on the display 210 at step 130.

Figure 6:
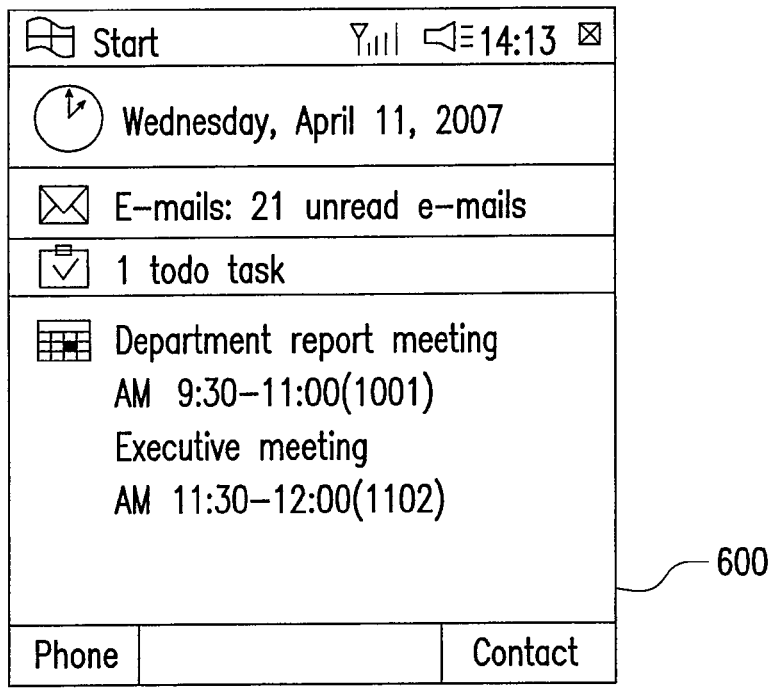
FIG. 6 and FIG. 7 are schematic diagrams showing the user interfaces of a handheld device according to an embodiment of the present invention.
Figure 7:
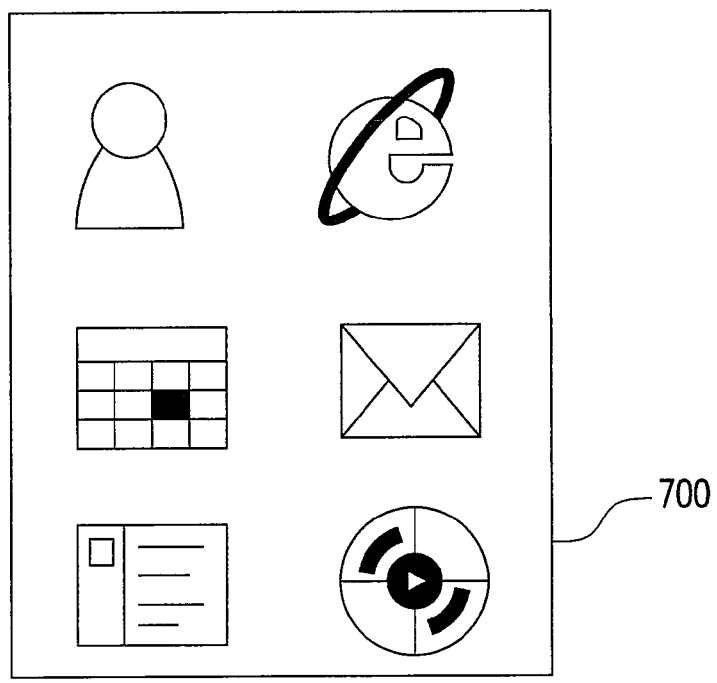

Please note that the processor in a handheld device may adjust the dimension of the items of the user interfaces according to the type of the input tool when switching and displaying user interfaces. For example, when the processor determines that the input tool is a stylus, the items of the user interface are displayed in normal dimension, as shown by the user interface 600 in FIG. 6. However, when the processor determines that the input tool is a finger, the items of the user interface are enlarged to finger-operable dimension so that the user can operate the user interface with a finger at ease, as shown by the user interface 700 in FIG. 7. The aforementioned items include virtual objects which can be selected by an input tool, such as icons or images.

Figure 8A:
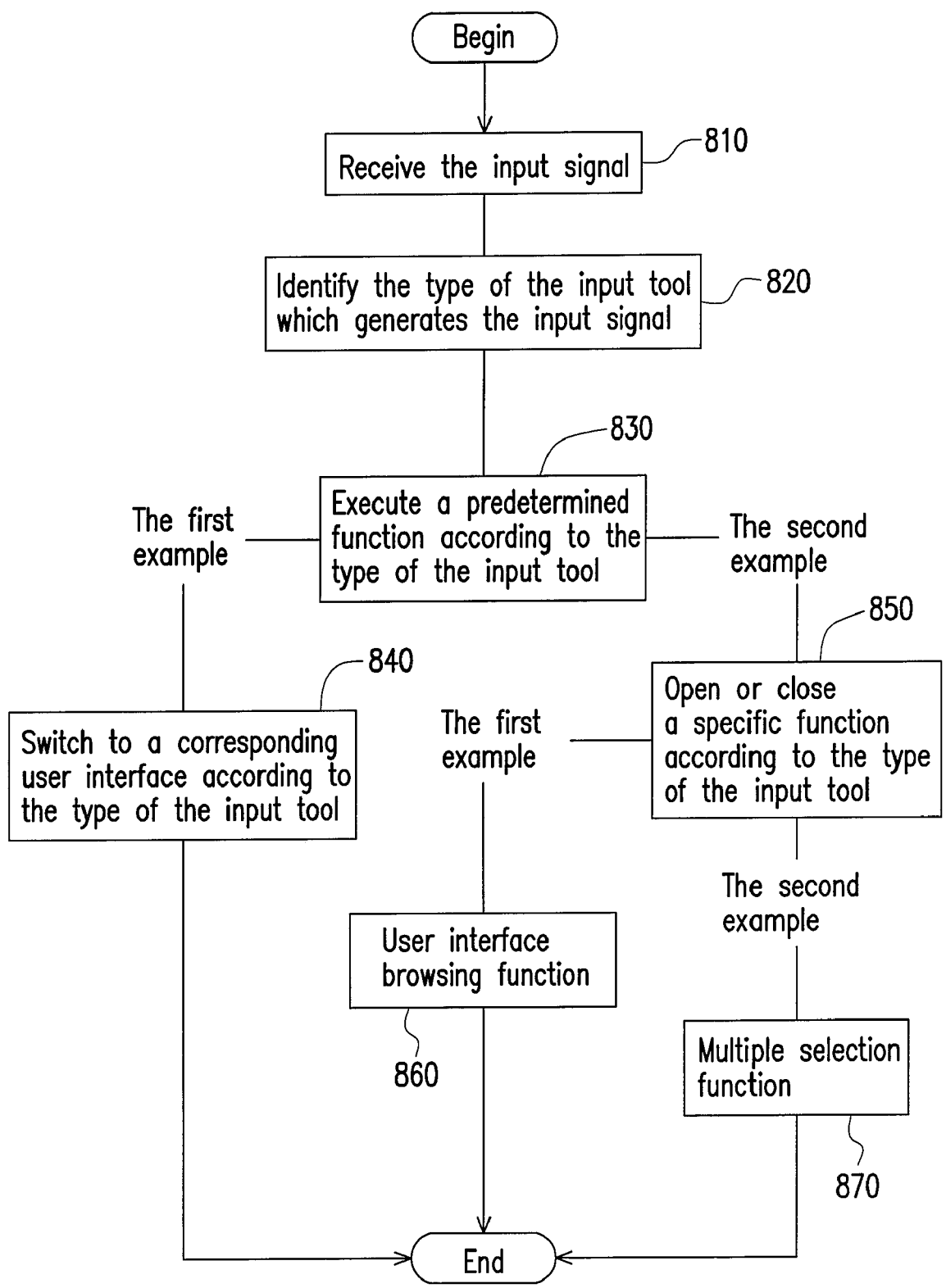
FIG. 8A to FIG. 8C are flow charts of a method for operating a user interface according to an embodiment of the present invention.

Except switching to different user interfaces according to the type of the input tool, the handheld device in the present invention may execute various predetermined functions in various ways according to the type of the input tool, as shown in the flow in FIG. 8. FIG. 8 is a flow chart of a method for operating a user interface executed by a handheld device according to an embodiment of the present invention. The flow is discussed in details as follows. First, the processor of the handheld device receives an input signal through a touch sensing means (step 810), and then identifies the type of the input tool which generates the input signal (step 820), and then executes a predetermined function according to the type of the input tool (step 830). For example, the predetermined function may be switching to a corresponding user interface according to the type of the input tool (step 840). The details of step 840 are already discussed in the previous embodiments. Therefore there is no need for repeated discussions here. Besides, the predetermined function of step 830 may be opening or closing a specific function according to the type of the input tool (step 850). The scope of the present invention is not limited to the predetermined functions shown in FIG. 8. In other embodiments of the present invention, the processor may execute other predetermined functions according to the type of the input tool.

The specific function of step 850 may be a user interface browsing function. The user interface browsing function may include a user interface panning function, a user interface scrolling function, or both the user interface panning function and the user interface scrolling function (step 860). For example, the user interface browsing function may be closed when the input tool is a stylus and be opened when the input tool is a finger so that the user can pan or scroll the display contents of the user interface by moving his or her finger.

Figure 8B:
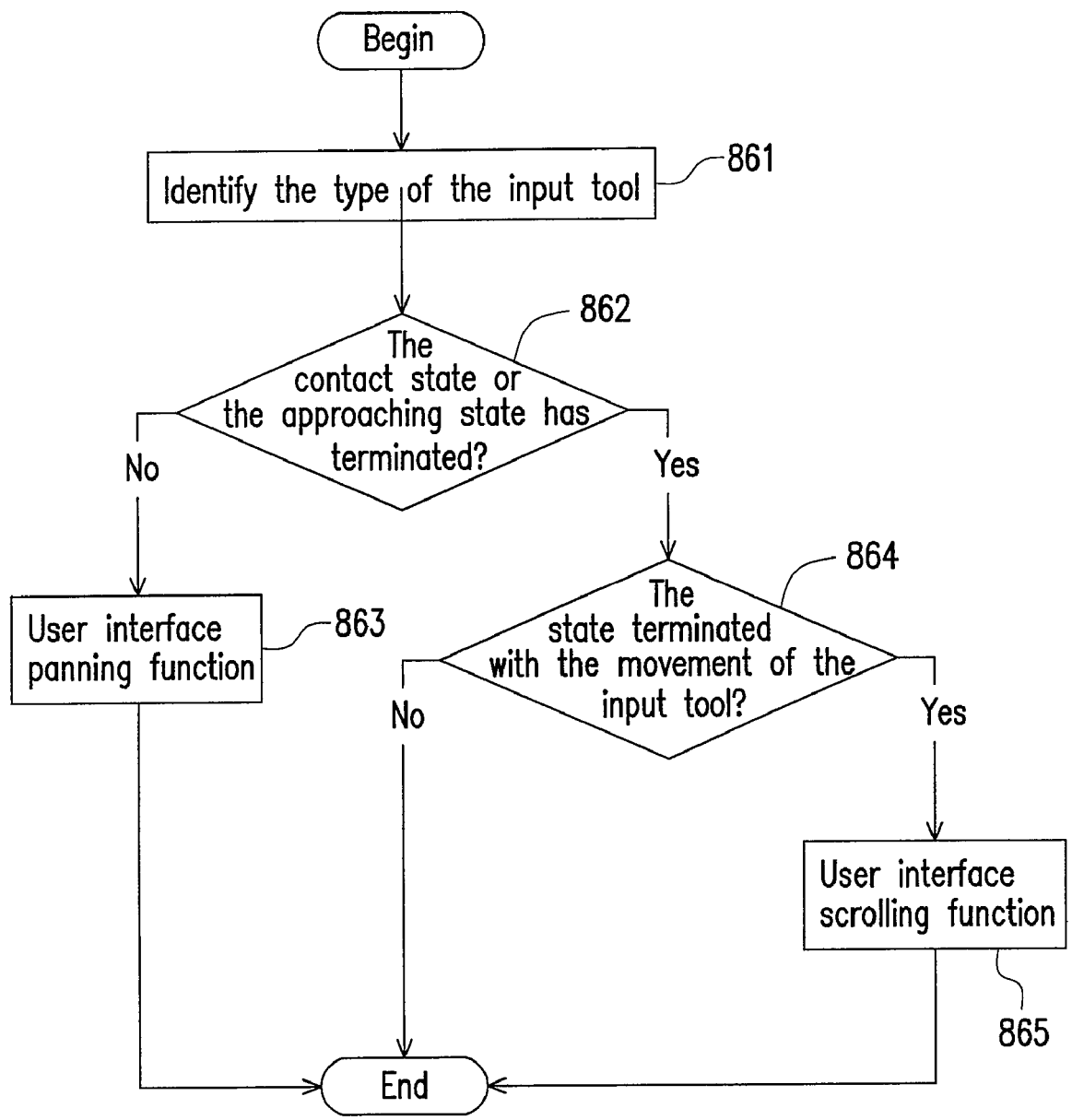

The details of step 860 are shown in FIG. 8B. First, at step 861, the input tool is identified as a finger and the user interface panning function and the user interface scrolling function are opened. At step 862, check whether the contact state or the approaching state of the finger has terminated or not. In other words, check whether the finger has left the touch sensing means. If the finger have not left yet, execute the user interface panning function at step 863 so that the user interface pans with the movement of the finger. On the other hand, if the finger has left the touch sensing means, check whether the finger moves when leaving the touch sensing means or not at step 864. If the finger did not move, the flow terminates. If the finger moved, the flow enters step 864 to execute the user interface scrolling function so that the user interface scrolls with the movement of the finger.

In addition, the specific function of step 850 may be a multiple selection function (step 870). For example, the multiple selection function may be opened when the input tool is a stylus so that the user can select multiple data items or function items in the user interface at the same time with a stylus. Furthermore, the multiple selection function may be closed when the input tool is a finger so that the user can only select one item at a time. Since a finger is not as precise as a stylus and is more prone to erroneous selection, such a design improves the precision and efficiency of using a handheld device.

Figure 8C:
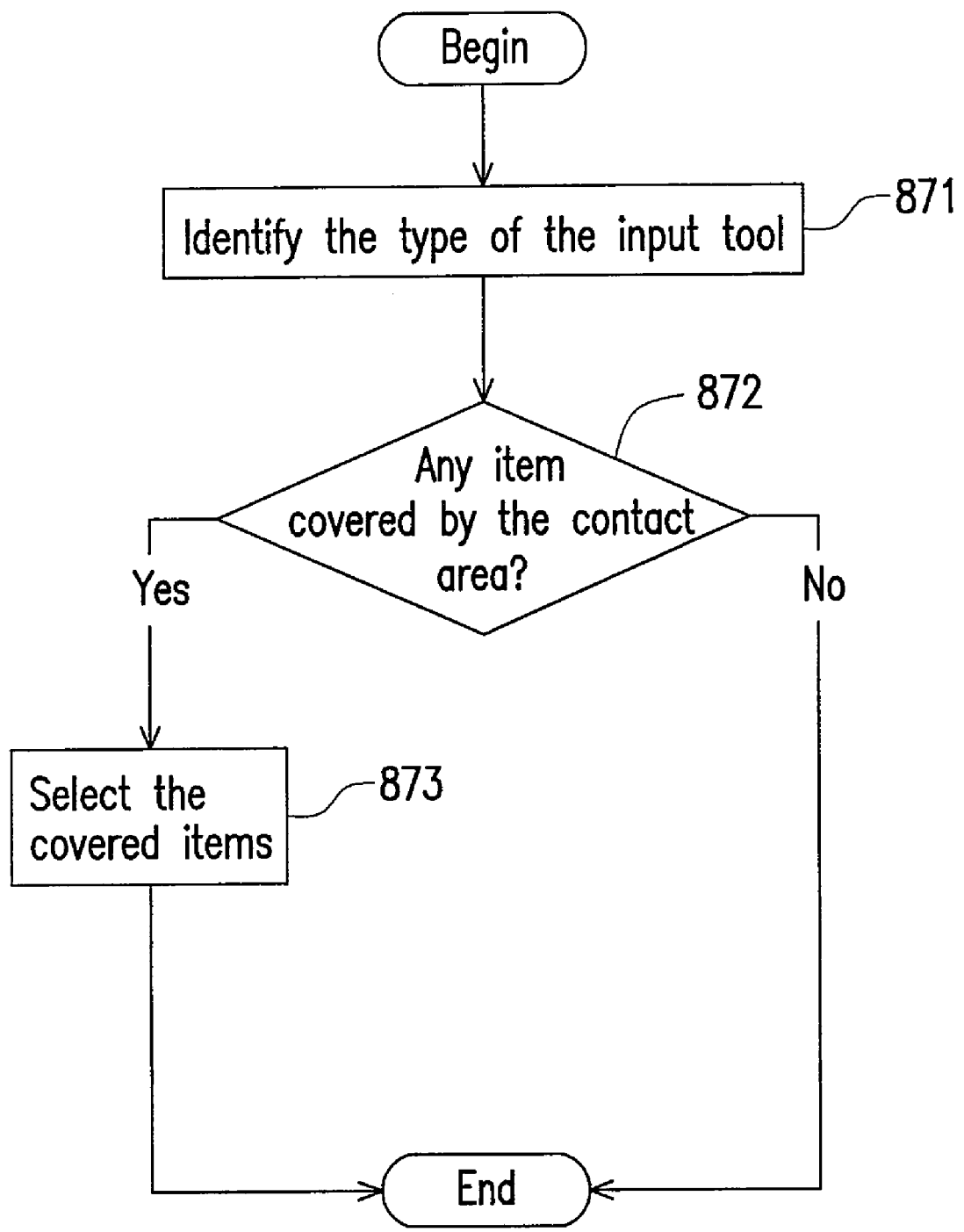

The details of step 870 are shown in FIG. 8C. First, at step 871, the input tool is identified as a stylus and the multiple selection function is opened. Next, at step 872, check whether the area of the contact or approaching of the stylus with the touch sensing means covers any user interface item or not. If the area does not cover any item, the flow terminates. If the area covers at least one item, select all the user interface items covered by the contact area at step 873.

After the processor executes the identification method provided by the present invention and determines the type of the input tool, the processor may open or close specific functions other than those enumerated in the previous embodiments according to the type of the input tool. In other words, in the flow in FIG. 8A, the identification method provided by the present invention includes at least steps 810 and 820, and the flow after step 820 may be designed according to the requirement of practical application. Steps 830 to 870 in FIG. 8A merely represent various embodiments in different applications.

The scope of handheld devices in the previous embodiments of the present invention may be extended to cover existing electronic devices. The flows of the methods in the previous embodiments may be executed by operating systems or applications of handheld devices or electronic devices in order to integrate functions of hardware such as electronic devices. The aforementioned operating systems or applications may be stored in computer-readable mediums and may be executed by processors of electronic devices. Since the technical details are already discussed in the previous embodiments, there is no need for repeated discussions here.

In the embodiments of FIG. 2A to FIG. 2D, the display and the touch sensing means are two independent components. The display is for displaying user interfaces while the touch sensing means is for receiving input signals. In other embodiments of the present invention, the display and the touch sensing means may be integrated into a touch display, as shown in FIG. 9A and FIG. 9B.

Figure 9A:
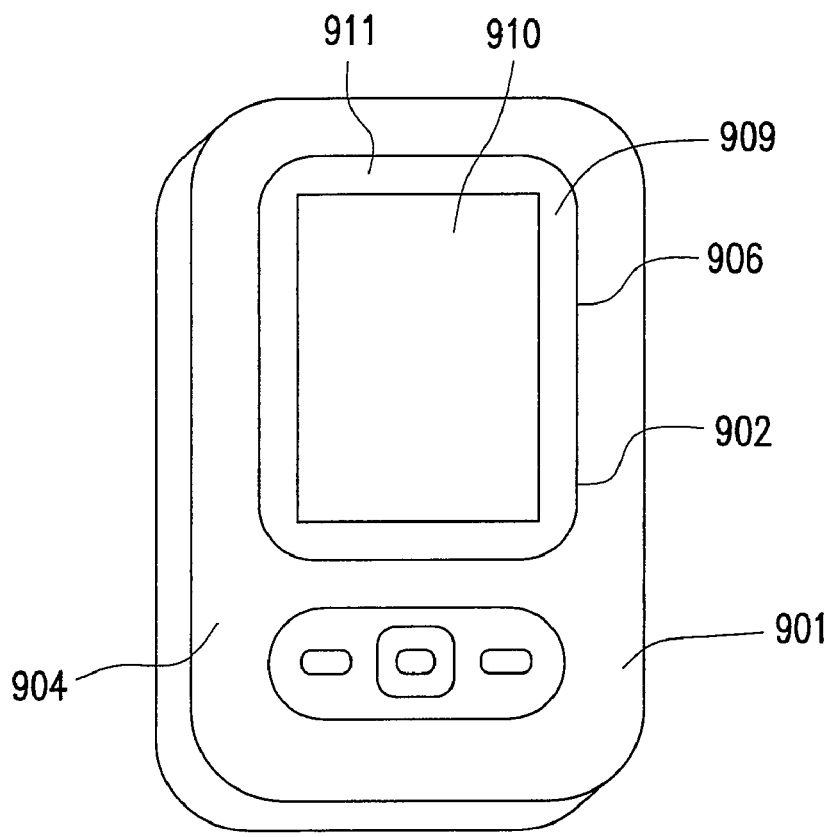
FIG. 9A is a frontal view of an electronic device according to an embodiment of the present invention.
Figure 9B:
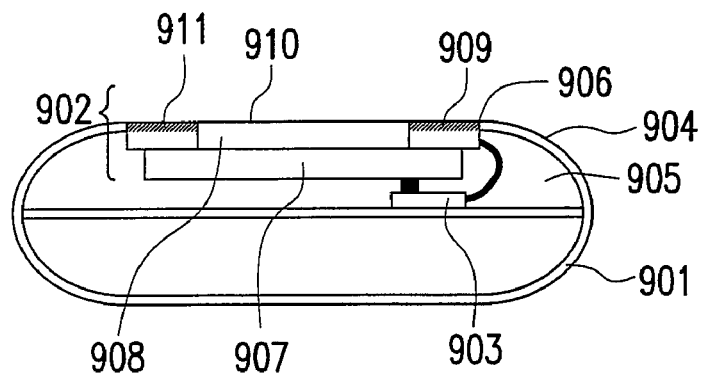
FIG. 9B is a cross-sectional view of the electronic device shown in FIG. 9A.

FIG. 9A is a 3D view of a handheld electronic device with no-hindrance touch operation according to an embodiment of the present invention. FIG. 9B is a cross-sectional view of the electronic device in FIG. 9A. The electronic device includes a casing 901, a touch display 902, and a processor 903. The casing 901 has an outer surface 904 and a container space 905. The container space 905 connects to outside through an opening 906 on the outer surface 904. The touch display 902 includes a display 907 and a touch sensing means 908. The display 907 is installed in the container space 905 of the casing 901. The touch screen 908 is installed in the opening 906 of the outer surface 904 of the casing 901 for receiving the operation of an input tool. The touch sensing means 908 has a sensing surface 909. The sensing surface 909 includes a display area 910 and a non-display area 911. The edge of the opening 906 of the casing 901 is continuously connected with the sensing surface 909 and the outer surface 904 of the casing 901 is level with the sensing surface 909. Here the casing 901 does not include hot keys or buttons of the handheld electronic device. The processor 903 is electrically coupled to the display 907 and the touch sensing means 908 for identifying the type of the input tool and executing predetermined functions according to the type of the input tool.

Please note that the outer surface 904 and the sensing surface 909 are equivalent to a single continuous and smooth surface because the outer surface 904 of the casing 901 is level with the sensing surface 909. The input tool may move and operate freely without hindrance on this equivalent single smooth surface. Moreover, since the non-display area 911 revealed by the sensing surface 909 is not covered by the casing 901 as in conventional design, the handheld electronic device not only enables the input tool to move and operate without hindrance but also provides the non-display area 911, which can be utilized to add more convenient applications of touch operation for the user.

As discussed in the previous embodiments, the processor 903 may identify the type of the input tool according to the detected area, pressure, temperature, or image when the input tool operates on the touch sensing means 908. The related details such as the flow of identification and the execution of predetermined functions are already discussed in the previous embodiments. Therefore there is no need for repeated discussions here.

In summary, the present invention is able to identify the type of the input tool and switch to the corresponding user interface or execute various predetermined functions in various ways according to the type of the input tool. As a result, the present invention not only provides a method for rapidly switching different user interfaces but also enables the users to operate handheld devices in a more convenient way, thus improving the efficiency and user friendliness of using handheld devices.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device with no-hindrance touch operation, configured for identifying a type of an input tool, comprising:
   a casing having an opening;
   a touch display disposed in the opening of the casing for receiving an operation of an input tool, wherein the touch display has a sensing surface, and an outer surface of the casing is substantially level with the sensing surface; and a processor electrically coupled to the touch display for identifying the type of the input tool and executing a predetermined function according to the type of the input tool, wherein the processor records a plurality of contact values in a specific duration, each of the contact values is a contact coordinate or a contact pressure detected when the input tool operates the touch display, the processor calculates an average of the contact values in the specific duration, calculates a variation range of the contact values in the specific duration according to differences between the contact values and the average, and then identifies the type of the input tool according to a size of the variation range.

2. The electronic device of claim 1, wherein the processor records the contact values at a predetermined sampling time interval in the specific duration.

3. The electronic device of claim 1, wherein the touch display comprises a display and a touch sensing means, the processor is electrically coupled to the display and the touch sensing means, the touch sensing means comprises a resistive sensing device and the contact values are detected by the resistive sensing device.

4. The electronic device of claim 3, wherein the touch sensing means comprises the sensing surface and the sensing surface comprises a display area.

5. The electronic device of claim 3, wherein the touch sensing means comprises the sensing surface and the sensing surface comprises a non-display area.

6. The electronic device of claim 1, wherein the touch display comprises a display and a touch sensing means, the processor is electrically coupled to the display and the touch sensing means, the touch sensing means comprises a capacitive sensing device and the contact values are detected by the capacitive sensing device.

7. The electronic device of claim 6, wherein the touch sensing means comprises the sensing surface and the sensing surface comprises a display area.

8. The electronic device of claim 6, wherein the touch sensing means comprises the sensing surface and the sensing surface comprises a non-display area.

9. The electronic device of claim 1, wherein the predetermined function comprises opening or closing a specific function according to the type of the input tool.

10. The electronic device of claim 1, wherein the predetermined function comprises switching to a corresponding user interface according to the type of the input tool.

11. The electronic device of claim 10, wherein the type of the input tool comprises a first type and a second type, the user interface corresponding to the first type is a general user interface including all functions of the electronic device, the user interface corresponding to the second type is a frequently used function interface including a part of the functions of the electronic device.

12. The electronic device of claim 11, wherein the first type comprises stylus and the second type comprises finger.

13. The electronic device of claim 12, wherein all items of the frequently used function interface are displayed in a finger-operable dimension, the items comprise icons or images which can be selected by the input tool.

14. The electronic device of claim 10, wherein the processor displays items of the user interface in a dimension corresponding to the type of the input tool.

15. An electronic device with no-hindrance touch operation, configured for identifying a type of an input tool, comprising:

a casing having an opening;

a touch display disposed in the opening of the casing for receiving an operation of an input tool, the touch display comprising a sensing surface, wherein an edge of the opening of the casing continuously connects with the sensing surface, and an outer surface of the casing is substantially level with the sensing surface; and a processor electrically coupled to the touch display for identifying the type of the input tool and executing a predetermined function according to the type of the input tool, wherein the processor records a plurality of contact values in a specific duration, each of the contact values is a contact coordinate or a contact pressure detected when the input tool operates the touch display, the processor calculates an average of the contact values in the specific duration, calculates a variation range of the contact values in the specific duration according to differences between the contact values and the average, and then identifies the type of the input tool according to a size of the variation range.

* * * * *